3,509,183
PROCESS FOR EPOXIDATION OF ALLYL
ALCOHOL BY PERACETIC ACID
Carroll J. Wenzke, Peekskill, N.Y., and Sol A. Mednick,
  Pikesville, Md., assignors to FMC Corporation, New
  York, N.Y., a corporation of Delaware
Filed July 17, 1967, Ser. No. 653,847
Int. Cl. C07d 1/18
U.S. Cl. 260—348.5                              10 Claims

ABSTRACT OF THE DISCLOSURE

This application discloses a continuous process for the rapid and efficient epoxidation of allyl alcohol by peracetic acid using a very small excess of allyl alcohol over the stoichiometric amount. The peracetic acid, dissolved in a high-boiling solvent, such as diisobutyl ketone, is introduced along with allyl alcohol into a distillation column which is operated under conditions such that peracetic acid distills upward in the column into a zone enriched in allyl alcohol where the epoxidation takes place very rapidly because of the high concentration of reactants. The reaction products glycidol and acetic acid, along with the solvent, pass downward in the column and are continuously withdrawn. The points at which allyl alcohol and peracetic acid are fed to the distillation column may be varied so that the alcohol can be fed above, below or with the peracetic acid feed. Subsequently, the acetic acid is rapidly and continuously separated from the glycidol in known manner.

BACKGROUND OF THE INVENTION

Field of the invention

Continuous, very rapid, epoxidation of allyl alcohol by peracetic acid to produce glycidol in high yield and purity.

Description of the prior art

Epoxidations of unsaturated organic compounds with organic peracids are generally conducted with one reactant present in substantial excess in order to obtain acceptable reaction rates and efficiencies. These epoxidations are generally conducted over a period of hours using solutions of organic peracids in an inert solvent. The dilutions caused by the use of excess reactant, and the solvent required in use of the organic peracid necessitate the use of large equipment to accommodate the large volumetric requirements of the processes. Furthermore, usually the unsaturated material is present in substantial excess, and must be recovered and recycled to the process for economical operation.

United States patent application Ser. No. 653,846, filed the same day as this application is a continuation-in-part of United States patent application Ser. No. 519,841 filed Jan. 11, 1961. These applications disclose a process for manufacturing glycidol, and if desired glycerol, by epoxidizing allyl alcohol with a 5 to 40% solution of peracetic acid in a substantially anhydrous, inert, organic solvent to produce glycidol in high yield and purity. The mole ratio of allyl alcohol to peracetic acid is between 5 and 0.7 moles of allyl alcohol per mole of peracetic acid; the preferred mole ratio being between 3 to 1.3 moles of allyl alcohol per mole of peracetic acid.

The process, as disclosed in the continuation-in-part application, epoxidizes allyl alcohol in a primary, or first stage, epoxidation or reaction zone, wherein 70% to 95% of the allyl alcohol is converted to glycidol before the reaction mixture is subjected to any distillation. Three to four hours are required to convert the allyl alcohol to glycidol. Formation of byproducts is minimized by rapid removal of coproduct acetic acid. The rapid removal of acetic acid is accomplished by a sequence of rapid and continuous distillations during which residual peracetic acid and allyl alcohol may react to form more glycidol. The glycidol recovered is of high quality and can be utilized as a chemical intermediate or hydrolyzed to produce an aqueous glycerol solution which can be purified without employing the extensive refining procedures used in the production of glycerol by other prior art processes.

SUMMARY OF THE INVENTION

We have now discovered a continuous process for rapidly epoxidizing allyl alcohol with peracetic acid to produce glycidol in a high yield based on allyl alcohol. Peracetic acid, dissolved in a high-boiling solvent such as diisobutyl ketone, is introduced along with allyl alcohol, the allyl alcohol being in at least a one percent molar excess, into a distillation zone which is operated with an overhead pressure of from 50 mm. to 400 mm. of Hg pressure and at temperatures such that the peracetic acid distills upward in the distillation zone into a zone enriched in allyl alcohol where epoxidation takes place. The enrichment of allyl alcohol occurs due to the reflux of allyl alcohol necessary to operate the distillation column. The temperature in the epoxidation zone is maintained in the range of from 30° to 90° C., and in the lower, or stripping, section of the distillation zone the temperature is maintained in the range of 50° to 120° C. The epoxidation takes place very rapidly because of the increased concentration of reactants and the reaction products, glycidol and acetic acid, together with solvent, pass downward in the column and are continuously withdrawn from the distillation zone after which acetic acid is rapidly and continuously separated from product glycidol.

This process has numerous advantages over the prior art processes for the epoxidation of allyl alcohol with peracetic acid:

(1) Peracetic acid from any source may be used, i.e. that produced by liquid or vapor phase expoxidation of acetaldehyde, reaction of hydrogen peroxide with acetic acid in a so called "generator" peracetic acid process (a "generator" process for making peracetic acid is disclosed in Canadian Patent 744,391) and the like.

(2) Allyl alcohol and peracetic acid can be reacted in nearly stoichiometric proportions. By virtue of the boil-up and reflux of allyl alcohol, or an allyl alcohol-rich overhead, a large instantaneous excess of allyl alcohol over peracetic acid is maintained in the column. However, under preferred conditions the net feed of allyl alcohol to the system represents only a small excess over the theoretical requirement.

(3) Dilute solutions of peracetic acid may be used. Enrichment of the peracetic acid occurs automatically in the column, so that the only disadvantage associated with the use of dilute solutions is the necessity of handling larger volumes of liquid in the column underflow. However, dilution of the underflow is desirable to minimize side reactions between glycidol and acetic acid. Thus, a large amount of solvent has the effect of improving efficiencies.

(4) The process requires a very short contact time between the reactants; the reaction rate is fast due to the maintenance of effective concentration of the reactants in the reaction zone; fewer side reactions occur; and the overall processing time is measured in minutes rather than hours.

DESCRIPTION OF THE INVENTION AND THE PREFERRED EMBODIMENTS

Figure 1:
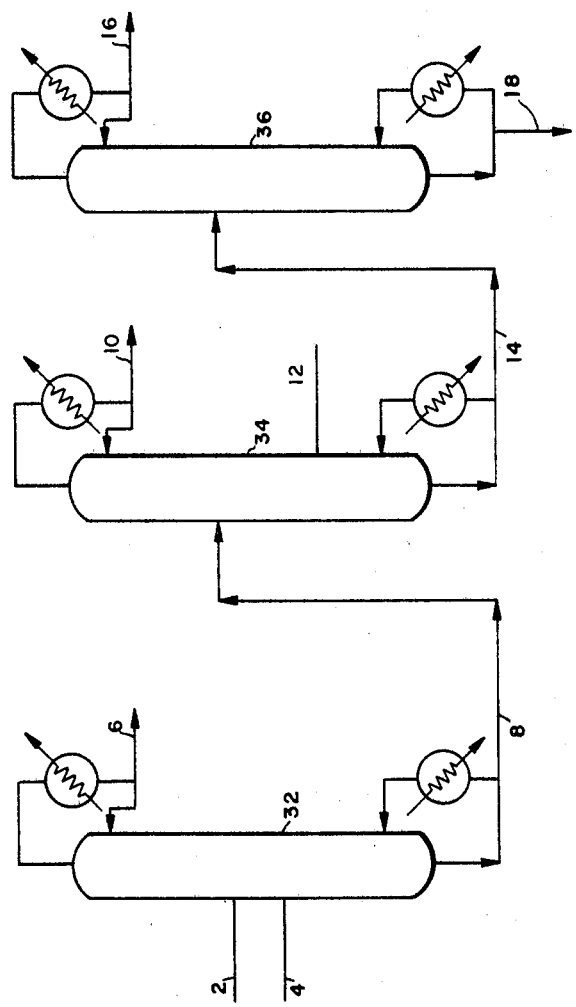
FIGURE 1 is a schematic diagram for the overall process in which the reactants are introduced separately and directly into the distillation column.

The epoxidation is carried out in a distillation column. Peracetic acid is dissolved in a solvent from which the peracetic acid has a high volatility. The peracetic acid solution is introduced at about the middle zone of the distillation column, and the allyl alcohol may be introduced at the same point, or above or below the peracetic acid feed point. The column is operated in such a manner that the allyl alcohol and peracetic acid rise in the column and are thereby enriched with respect to each other. The reaction products, glycidol and acetic acid, and the solvent, descend in the column and are continuously withdrawn. The acetic acid is then rapidly and continuously separated from the product glycidol by known means.

An alternative, convenient method of operation is to premix the allyl alcohol and the peracetic acid solution, then feed the mixture to the distillation column. This is a safety feature, as in this way development of dangerously high concentrations of peracetic acid can be avoided by insuring prior admixture with allyl alcohol. Also, a portion of the reaction can be accomplished external to the column and the heat corresponding to this initial reaction can be removed by direct cooling, thereby reducing the heat load on the distillation column.

The reactants are allyl alcohol and peracetic acid. The allyl alcohol is generally of 95% or higher purity, although in principle it could be supplied as a solution in the same solvent as the peracetic acid. The peracetic acid is introduced to the reaction in the form of a dilute solution, containing up to 40%, preferably 5 to 40% and most preferably 5 to 20%, by weight of peracetic acid dissolved in a substantially anhydrous, inert, organic solvent. Acetic acid concentrations in the peracetic acid solvent solutions generally range from about 5 to 20%. A slight excess of allyl alcohol is preferred to avoid the possibility of encountering high level concentrations of peracetic acid with consequent explosion hazards. Reactant ratios above 1.01 moles of allyl alcohol per mole of peracetic acid are suitable, with ratios of 1.01–1.10 moles of allyl alcohol per mole of peracetic acid being preferred. Higher mole ratios may be used but offer no advantage since the system automatically maintains a high instantaneous ratio in the reaction zone.

The temperature is selected to insure a desirable rate and efficiency of reaction and a corresponding pressure is selected to insure that the peracetic acid and allyl alcohol ascend in the column to the reactant-enriched reaction zone and the acetic acid, glycidol and solvent descend in the column. The temperatures used in the reaction zone range from about 30° C. to about 90° C. and preferably about 40° C. to 65° C. The column overhead pressure ranges from about 50 mm. of Hg to about 400 mm. of Hg and preferably from about 100 mm. to 200 mm. of Hg.

The residence time in the reaction zone (defined as liquid hold-up under operating conditions divided by total net liquid feed rate) varies depending upon the temperature profile of the reaction zone. Typical residence times are about 1 to 30 minutes, with 5 to 15 minutes being preferred.

Depending upon the manner of operation, the overhead vapors from the reaction zone may be substantially allyl alcohol or mixtures of allyl alcohol and peracetic acid. Solvent may also be present, depending upon the volatility of the solvent and the point of introduction of the peracetic acid solution into the reaction zone. The precise composition of the overhead is not critical to the invention, since the overhead is condensed and returned to the column as reflux or admixed with the feed to the reaction zone. Volatile impurities which may be present in the allyl alcohol and peracetic acid solution, or formed in the reaction, may accumulate in the overhead and may be purged from the system by drawing off a small sidestream from the overhead. Such impurities may include acetaldehyde, methanol, methyl acetate, water, allyl acetate, propionaldehyde, n-propanol, acetone, acrolein and diallyl ether. The reaction zone overhead may accumulate substantial amounts of these impurities.

The size and the conditions of operation of the column must be such that the underflow is substantially free of allyl alcohol and peracetic acid. Thus, the residence time and temperature in the column must be adjusted so that substantially complete conversion of peracetic acid is achieved in the column. The column underflow, consisting primarily of glycidol, acetic acid and solvent can then be processed subsequently to achieve separation of these components.

Solvents useful in this process are generally those having atmospheric boiling points between about 110° C. and 180° C. In any event the boiling point of the solvent should be above the boiling point of peracetic acid so that the peracetic acid separates from the solvent in the column. Preferred solvents are those having atmospheric boiling points between 130° and 170° C. The solvent must be compatible chemically with the reactants and products, and have a volatility such that the peracetic acid can be distilled upward in the reaction zone while acetic acid passes downward in the reaction zone. Suitable solvents include, but are not limited to, butyl acetate, amyl acetate, butyl butyrate, ethylbenzene, heptanone-2, xylenes, dibutyl ether, cumene, pseudocumene, monochlorobenzene, ortho-dichlorobenzene, methyl heptyl ketone and diisobutyl ketone.

Solvents whose boiling temperatures are substantially higher than the boiling point of glycidol are less suitable, since these materials tend to prevent the removal of glycidol and especially acetic acid in the underflow from the distillation column.

The process for the preparation of glycidol by introducing allyl alcohol and peracetic acid separately and directly to a distillation column is described with reference to FIGURE 1. Peracetic acid at 5 to 40%, and preferably 5 to 20% by weight concentration in a substantially anhydrous, inert solvent such as diisobutyl ketone is fed through line 2 to column 32. Allyl alcohol is fed through line 4 to column 32. The lower section of column 32, the stripping section, is maintained at about 50° to 120° C., the upper section of column 32, the reaction zone, is maintained at about 30° to 90° C. and a pressure of about 50 mm. to 400 mm. of Hg is utilized when diisobutyl ketone is used as the solvent. The column overhead, consisting primarily of allyl alcohol, is condensed and returned to column 32. A small amount of the condensed overhead is withdrawn from the process through line 6 to prevent the accumulation of volatile by-products or impurities in the feed. The reaction products, glycidol and acetic acid, along with solvent pass downward in the column and leave the column as an underflow through line 8 and are fed to column 34.

Column 34 is a distillation column which is maintained at reduced pressure. Acetic acid is separated from glycidol in this column and removed from the process through line 10. Product glycidol is recovered through line 12 and may be in the form of a glycidol-solvent azeotrope. Solvent and high boilers are withdrawn as an underflow from column 34 and fed through line 14 to column 36 which is operated at reduced pressure. The organic solvent is vaporized and removed through line 16 and the high boilers are removed as an underflow and separated from the process through line 18.

Figure 2:
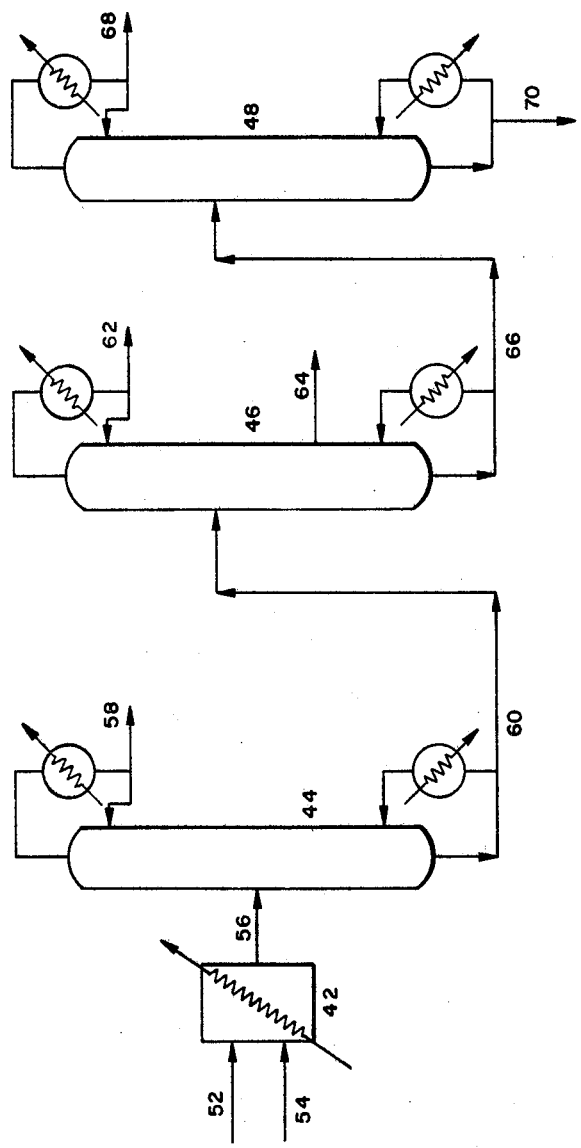
FIGURE 2 is a schematic diagram for the overall process in which the reactants are premixed and then introduced together into the distillation column.

The process for the preparation of glycidol by premixing the reactants in a premixer and introducing the mixed reactants together into the distillation column is described with reference to FIGURE 2. Peracetic acid at 5–40%, and preferably 5–20% by weight concentration in a substantially anhydrous, inert, solvent, such as diisobutyl ketone, is fed through line 52 to premixer 42. Allyl alcohol is fed through line 54 to premixer 42. The residence time in the premixer is generally controlled to about 20 minutes and the temperature is maintained at about 35–65° C. Under these conditions approximately 25% of the allyl alcohol is converted to glycidol in the premixer. The mixture from the premixer is fed through line 56 to column 44. The lower section of column 44, the stripping section, is maintained at about 50° to 120° C., the upper section of column 44, the reaction zone, is maintained at about 30°–90° C. and at a pressure of about 50 mm. to 400 mm. of Hg when diisobutyl ketone is used as the solvent. The column overhead, consisting primarily of allyl alcohol, is condensed and returned to column 44. A small amount of the condensed overhead is withdrawn from the process through line 58 to prevent the accumulation of volatile byproducts or impurities in the feed. The reaction products, glycidol and acetic acid, along with solvent, pass downward in the column and leave the column as underflow through line 60 and are fed to column 46.

Column 46 is a distillation column which is maintained at reduced pressure. Acetic acid is separated from the glycidol in this column and is removed from the process through line 62. Product glycidol is recovered through line 64 and may be in the form of a glycidol-solvent azeotrope. Solvent and high boilers are withdrawn from column 46 as an underflow and are fed through line 66 to another distillation column, 48, which is operated at reduced pressure. The organic solvent is vaporized and removed from column 48 through line 68. High boilers are removed as an underflow from column 48 and separated from the process through line 70.

The following examples illustrating the novel process disclosed herein, are given without any intention that the invention be limited thereto. All parts and percentages are by weight unless otherwise indicated.

EXAMPLE 1

A two-inch continuous Oldershaw column was arranged as follows: condenser, magnetic reflux head controlled to give a reflux ratio of 15:1, 5 trays, temperature control section, allyl alcohol feed section, twenty trays, peracetic acid feed section, thirty trays, and a reboiler.

The column was started up and controlled at a head pressure of 100 mm. of Hg with pure diisobutyl ketone in the column. The reactants were introduced to the column as follows: allyl alcohol, 2,042 grams, 98.7% assay, 34.70 moles, which was fed to the column at a rate of 3.06 grams (0.053 mole) per minute; peracetic acid, 8.15% and acetic acid 3.12% in diisobutyl ketone, 17,348 grams of solution were fed to the column at a rate of 25.0 grams per minute, equivalent to 0.028 mole of peracetic acid per minute, or a total of 18.84 moles of peracetic acid. The acetic acid content of the feed was 9.01 moles.

The reaction column was operated at 100 mm. of Hg and the overhead vapor temperature was 46°–48.5° C., the allyl alcohol feed plate 51.5° to 52° C., the peracetic acid feed plate 72° to 73.5° C. and the reboiler was operated from 96° to 99° C.

Distillate was recovered overhead which weighed 1,154 grams and contained the following components: acetaldehyde, 0.04%; propionaldehyde, 0.1%; methyl acetate, 2.5%; acrolein, 1.6%; methanol, 3.8%; diallyl ether, 0.4%; allyl acetate, 1.0%; propanol, 0.9%; allyl alcohol, 85.2%; glycidol, 0.49%; acetic acid, 0.66%; and unknown components, 3.2%. The residence time in the column was about ten minutes.

The underflow from the reaction zone was 18,109 grams containing 0.04% peracetic acid and 0.03 low boilers including allyl alcohol. The underflow was fed into a sequence of continuous distillation zones and distilled to produce 24.14 moles of acetic acid and 15.02 moles of glycidol and a small amount of high boilers.

This example shows the process can be run at high mole ratios of allyl alcohol per mole of peracetic acid; however this is not desirable because of the cost involved in recovering allyl alcohol.

EXAMPLE 2

A two-inch Oldershaw column was arranged as follows: condenser, magnetic reflux head, temperature control section, five trays, allyl feed section, twenty trays, peracetic acid feed section, twenty trays, and a reboiler.

The pressure in the column was adjusted to 100 mm. of Hg pressure, diisobutyl ketone was introduced and heated, and the allyl alcohol feed was begun when the diisobutyl ketone vapors reached the peracetic acid feed section. The column was maintained under total reflux until the temperature at the peracetic acid feed section stabilized at 60° C. A solution of peracetic acid in diisobutyl ketone was then introduced to the column at the rate indicated in the following table. Simultaneously, allyl alcohol was fed to the column at a rate such that the peracetic feed plate temperature was held at 62°–63° C. When the column reached equilibrium, the overhead vapor temperature was 40.5° C., and the underflow temperature 94°–95° C. Weighed quantities of the reactants allyl alcohol and peracetic acid-acetic acid solution in diisobutyl ketone were then introduced to the column as follows:

|  | Feed composition, weight percent | Total feed, moles | Feed rate, moles/min. |
| --- | --- | --- | --- |
| Allyl alcohol | 97.9 | 26.33 | .0410 |
| Peracetic acid solution: |  |  |  |
| Peracetic acid | 7.88 | 23.95 | .0373 |
| Acetic acid | 4.98 | 19.17 | .0298 |

About 1.8% of the total feed was taken overhead and analysis showed it to be about 50 to 55% allyl alcohol corresponding to 3.78 moles. The underflow contained 20.19 moles of glycidol, representing a 93.1% efficiency on unrecovered allyl alcohol. The underflow also contained 41.37 moles of acetic acid or 95.9% of the total organic acids fed to the system.

The residence time in the column was about six minutes. The column underflow was fed to a continuous distillation zone, and distilled to separate the acetic acid and a small amount of high boilers from the glycidol.

EXAMPLE 3

A two-inch Oldershaw column was arranged as follows: condenser, magnetic reflux head, temperature control section, ten trays, peracetic acid feed section, ten trays, allyl alcohol feed section, temperature control section for control of allyl alcohol feed rate, thirty trays, and a reboiler. The allyl alcohol feed in this example was introduced below the peracetic acid feed.

The column was started up as described in Example 2. A solution of peracetic acid (7.71%) and acetic acid (5.01%) in diisobutyl ketone was then introduced at the rate of 32.8 grams per minute to the peracetic acid feed section, while allyl alcohol (98.7% assay) was fed simultaneously at 2.17 grams per minute to the allyl alcohol feed section. The total peracetic acid solution fed to the column was 10,520 grams (10.67 moles), and 695 grams (11.81 moles) of allyl alcohol were fed to the column.

The column was operated to maintain the overhead vapor temperature at 39.5° to 40.5° C. The allyl alcohol feed plate temperature was 62° to 64.5° C. and the reboiler was operated at 96° to 99° C. The distillate removed overhead weighed 155 grams and contained 44.1% allyl alcohol (1.10 moles). The residence time in the column was about eight minutes.

The underflow (11,060 grams), contained 7.06% glycidol, (10.54 moles) and 10.12% acetic acid (18.63 moles). The underflow also contained allyl alcohol (0.14%, 0.27 mole) and peracetic acid (0.07%, 0.10 mole). The apparent efficiency of allyl alcohol conversion to glycidol was 100.8%; after correction for over accountability of allyl alcohol, the efficiency was estimated to be 98.0% Recovery of acetic acid-peracetic acids was 96.5% of the acids fed.

The glycidol was recovered from the underflow from the reaction zone as described in Example 1.

EXAMPLE 4

Allyl alcohol and peracetic acid were fed to a premixer and mixed together at a temperature of about 53° to 55° C. for about twenty minutes during which time approximately 25% of the allyl alcohol feed was converted to glycidol in the premixer. A two-inch Oldershaw column was arranged as in Example 3, except that the mixed feed was introduced at the peracetic acid feed point and a portion of the reflux was diverted to what had been the allyl alcohol feed section so as to maintain approximately the same allyl alcohol flow rates and concentration gradients in the column. The column was operated as described in Example 3 and allyl alcohol was converted to glycidol at a chemical efficiency of 96%. Recovery of acetic acid was 96.5% of the total organic acids fed to the system. The underflow from the reaction column was treated by continuous distillation as described in Example 1 to separate glycidol from the acetic acid. The residence time in the column was about eight minutes.

EXAMPLE 5

A two-inch Oldershaw column was arranged as described in Example 3. The column was started up at 175 mm. Hg using ethylbenzene solvent. The ethylbenzene was introduced and heated, and allyl alcohol feed was begun when the ethylbenzene vapors reached the peracetic feed section. A solution of peracetic acid (8.20%) an acetic acid (2.56%) in ethylbenzene was introduced at a rate of 29.5 g./minute, while allyl alcohol (98.6%) was fed at a rate of 2.12 g./minute. A total of 17,700 g. (19.10 moles) of peracetic acid solution and 1,291 g. (21.92 moles) of allyl alcohol were fed. The overhead vapor temperature was 56° to 60° C., the peracetic acid feed plate was 64° to 67° C. and the reboiler was at 94° to 97° C. Three hundred grams of distillate containing 56% allyl alcohol (2.90 moles) were taken overhead. The underflow (18.690 g.) contain 7.09% glycidol (17.90 moles, 94.0% efficiency based on allyl alcohol consumed) and 8.10% acetic acid (25.20 moles, 94.5% recovered based on total organic acids fed). The residence time in the column was about ten minutes. The underflow was subsequently processed by continuous distillation in a second distillation column to separate acetic acid from product glycidol. The second distillation column which separated the acetic acid was operated to separate glycidol azeotrope from the solvent, and high boilers, which were removed from the distillation column as an underflow. The underflow containing solvent and high boilers was distilled in another distillation column to separate solvent which was returned to the process. High boilers were removed from the third distillation zone as an underflow.

As will be apparent to those skilled in the art, numerous modifications and variations of the process illustrated above may be made without departing from the spirit of the invention or the scope of the following claims.

What is claimed is:

1. A continuous process for the epoxidation of allyl alcohol by peracetic acid to produce glycidol in high yields comprising:

(a) introducing allyl alcohol into a distillation zone;

(b) introducing peracetic acid in a 5 to 40% solution in a substantially anhydrous, inert, organic solvent, whose atmospheric boiling point is between 110° C. and 180° C., into the distillation zone, the mole ratio allyl alcohol to peracetic acid being at least 1.01 moles of allyl alcohol per mole of peracetic acid;

(c) distilling the peracetic acid and allyl alcohol upward in the distillation zone into a reaction zone enriched in allyl alcohol where rapid epoxidation of the allyl alcohol occurs while maintaining the reaction zone at a temperature of 30° C. to 90° C. and at a corresponding reduced pressure;

(d) allowing the epoxidation reaction products, glycidol and acetic acid, and solvent to pass downward in the distillation zone; and (e) continuously withdrawing the reaction products and solvent from the lower portion of the distillation zone and removing unreacted allyl alcohol and low boiling by-products as overhead vapors.

2. The process of claim 1 in which the temperature in the lower section of the distillation zone is maintained between 50° C. and 120° C.

3. The process of claim 1 in which the epoxidation temperature is 40° C. to 65° C.; the temperature in the lower section of the distillation zone is in the range of 65° C. to 120° C.; and the distillation zone overhead pressure is between 50 mm. and 200 mm. of Hg pressure.

4. The process of claim 1 further comprising separating allyl alcohol from the overhead vapors and returning the allyl alcohol to the distillation zone.

5. The process of claim 1 in which the inert organic solvent has an atmospheric boiling point of between 130° C. and 170° C.

6. The process of claim 1 in which the inert organic solvent is selected from the group consisting of butyl acetate, amyl acetate, butyl butyrate, ethylbenzene, ortho-xylene, pseudo-cumene, monochlorobenzene, ortho-dichlorobenzene, methyl heptyl ketone and diisobutyl ketone.

7. The process of claim 1 in which the residence time of the reactants in the distillation zone is between 1 and 30 minutes.

8. The process of claim 7 in which the residence time of the reactants in the distillation zone is between 5 and 15 minutes.

9. The process of claim 1 further comprising continuously separating acetic acid from the underflow from the distillation zone in a second distillation zone at a pressure below 400 mm. of Hg pressure and recovering product glycidol.

10. The process of claim 1 further comprising premixing the allyl alcohol and peracetic acid solution and feeding the mixture of reactants to the distillation zone.

References Cited

UNITED STATES PATENTS

| | | | |
|---|---|---|---|
| 3,238,229 | 3/1966 | Reid | 260—348.5 |
| 3,259,638 | 7/1966 | Allison | 260—348.5 |
| 3,278,562 | 10/1966 | Thigpen et al. | 260—348.5 |
| 3,321,493 | 5/1967 | Beesley et al. | 260—348.5 |
| 3,347,763 | 10/1967 | Coffey et al. | 260—348.5 X |
| 3,393,232 | 7/1968 | Lanos et al. | 260—348.5 |
| 3,404,163 | 10/1968 | Budde et al. | 260—348.5 |

NORMA S. MILESTONE, Primary Examiner